United States Patent
Kitazawa et al.

(10) Patent No.: US 9,887,763 B2
(45) Date of Patent: Feb. 6, 2018

(54) SATELLITE SIGNAL RECEPTION DEVICE (71) Applicant: SEIKO EPSON CORPORATION, Tokyo (JP)

(72) Inventors: Takeo Kitazawa, Chino (JP); Shigeto Chiba, Shiojiri (JP); Toshiyuki Misawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/458,320

(22) Filed: Mar. 14, 2017

(65) Prior Publication Data
US 2017/0279520 A1 Sep. 28, 2017

(30) Foreign Application Priority Data
Mar. 22, 2016 (JP) ................. 2016-057296

(51) Int. Cl.
*H04B 7/185* (2006.01)
*H04L 7/033* (2006.01)
*G01S 19/34* (2010.01)
*G01S 19/32* (2010.01)

(52) U.S. Cl.
CPC .......... *H04B 7/18515* (2013.01); *G01S 19/32* (2013.01); *G01S 19/34* (2013.01); *H04B 7/18513* (2013.01); *H04L 7/0331* (2013.01)

(58) Field of Classification Search
CPC .......... G01S 19/37; G01S 19/13; G01S 19/36
See application file for complete search history.

(56) References Cited

U.S. PATENT DOCUMENTS

| 5,812,591 | A | * | 9/1998 | Shumaker | H04B 1/28 331/22 |
| 2007/0096980 | A1 | * | 5/2007 | Gradincic | G01S 19/32 342/357.72 |
| 2009/0115659 | A1 | * | 5/2009 | Watanabe | G01S 19/33 342/357.73 |
| 2013/0088388 | A1 | * | 4/2013 | Aibara | G01S 19/29 342/357.63 |
| 2013/0336368 | A1 | * | 12/2013 | Arima | H04B 1/7097 375/144 |

(Continued)

FOREIGN PATENT DOCUMENTS

JP 2011-209288 A 10/2011

*Primary Examiner* — Ross Varndell
(74) *Attorney, Agent, or Firm* — Oliff PLC (57) ABSTRACT

A satellite signal reception device includes: a local signal generator that generates a signal while switching between a signal having a first local frequency corresponding to a first positioning satellite signal and a signal having a second local frequency corresponding to a second positioning satellite signal based on a reference clock signal; and a frequency converter that converts a reception signal of the first positioning satellite signal into a first intermediate frequency signal by multiplying the reception signal of the first positioning satellite signal by the signal having the first local frequency, and converts a reception signal of the second positioning satellite signal into a second intermediate frequency signal of which at least a part of a converted frequency band is in common with the first intermediate frequency signal multiplying the reception signal of the second positioning satellite signal by the signal having the second local frequency.

4 Claims, 6 Drawing Sheets (56) References Cited

U.S. PATENT DOCUMENTS

2014/0169410 A1\* 6/2014 Tanaka .................... G01S 19/37
 375/148
2015/0022398 A1\* 1/2015 Yamashina ............. G01S 19/30
 342/357.68

\* cited by examiner

[CARRIER FREQUENCY]

FIG. 3

[INTERMEDIATE FREQUENCY]

SATELLITE SIGNAL RECEPTION DEVICE

BACKGROUND

1. Technical Field

The present invention relates to a satellite signal reception device that receives a positioning satellite signal.

2. Related Art

In recent years, a so-called multi-Global Navigation Satellite Systems (GNSS) correspondence receiver (hereinafter, referred to as a GNSS receiver) capable of coping with various types of satellite positioning systems such as Global Positioning System (GPS) GLObal NAvigation Satellite System (GLONASS) BeiDou, and Galileo has been developed. Since the satellite positioning systems have been operated by independent specifications and a carrier frequency of a positioning satellite signal is different for each satellite positioning system, receivers corresponding to the positioning satellite systems are typically provided in the GNSS receiver (for example, see JP-A-2011-209288).

Since the GNSS receiver is mounted on a portable or small-sized electronic device operated by a battery in many cases, reduction in size and power consumption of the receiver is one of important matters. In the GNSS receiver, a so-called down-conversion for converting a reception signal into an intermediate frequency signal by multiplying the reception signal by a local signal is performed. In JP-A-2011-209288, since a local signal supplied to the respective receivers is common to the respective receivers, it is possible to reduce power consumed for generating the local signal, but it is necessary to separately provide the receivers for the positioning satellite systems since a converted intermediate frequency is different depending on the carrier frequency of the received satellite signal. As a result, an advantage of reducing the power consumption is low in terms of the entire receiver.

SUMMARY

An advantage of some aspects of the invention is to reduce a size and power consumption of a satellite signal reception device that receives satellite signals of a plurality of satellite positioning systems.

A first aspect of the invention is directed satellite signal reception device including: a local signal generator that generates a signal while switching between signal having a first local frequency corresponding to a first positioning satellite signal and a signal having a second local frequency corresponding to a second positioning satellite signal based on a reference clock signal; and a frequency converter that converts a reception signal of the first positioning satellite signal into a first intermediate frequency signal by multiplying the reception signal of the first positioning satellite signal by the signal having the first local frequency, and converts a reception signal of the second positioning satellite signal into a second intermediate frequency signal of which at least a part of a converted frequency band is in common with the first intermediate frequency signal by multiplying the reception signal of the second positioning satellite signal by the signal having the second local frequency.

According to the first aspect, since the local signal generator and the frequency converter can be commonly used in the satellite signal reception device that receives the first positioning satellite signal and the second positioning satellite signal, it is possible to reduce a size of the device, and it is possible to reduce power consumption. Specifically, since the signal is generated while being switched between the signal having the first local frequency and the signal having the second local frequency which respectively correspond to the first positioning satellite signal and the second positioning satellite signal in the local signal generator such that at least parts of the frequency bands of the converted intermediate frequencies are common, it is possible to commonly use the processor for the converted intermediate frequency signals. Since it is possible to further reduce the converted intermediate frequency than in a case where the frequency bands of the converted intermediate frequencies are not commonly used, it is possible to reduce power consumption required in a circuit operation.

As a second aspect, the satellite signal reception device according to the first aspect may be configured to further include: a second local signal generator that generates a signal having a third local frequency corresponding to a third positioning satellite signal based on the reference clock signal; and a second frequency converter that converts a reception signal of the third positioning satellite signal into a third intermediate frequency signal by multiplying the reception signal of the third positioning satellite signal by the signal having the third local frequency.

According to the second aspect, it is possible to realize the satellite signal reception device capable of receiving the third positioning satellite signal.

As a third aspect, the satellite signal reception device according to the first or second aspect may be configured such that the local signal generator includes a reference signal divider that divides the reference clock signal, and outputs a reference signal, and a PLL that includes an oscillator which oscillates an output signal of the local signal generator in response to a given control signal, an oscillation signal divider which divides the output signal of the oscillator, and a filter which compares the signal divided by the oscillation signal divider with the reference signal and generates the control signal which reduces a frequency difference.

According to the third aspect, since the local signal generator changes the division ratios of the reference signal divider and the oscillation signal dividers, it is possible to generate signals having different local frequencies.

As a fourth aspect, the satellite signal reception device according to the third aspect may be configured such that the reference signal divider and the oscillation signal divider are integer dividers in which 1/2 dividers having a division ratio of 1/2 are connected in series.

According to the fourth aspect, since the output signals of the plurality of 1/2 dividers connected in series function as counters, the output signals of the dividers are reset depending on the count values, and thus, it is possible to realize the integer dividers.

BRIEF DESCRIPTION OF THE DRAWINGS

The invention will be described with reference to the accompanying drawings, wherein like numbers reference like elements.

DESCRIPTION OF EXEMPLARY EMBODIMENTS

Portable Electronic Device

Figure 1:
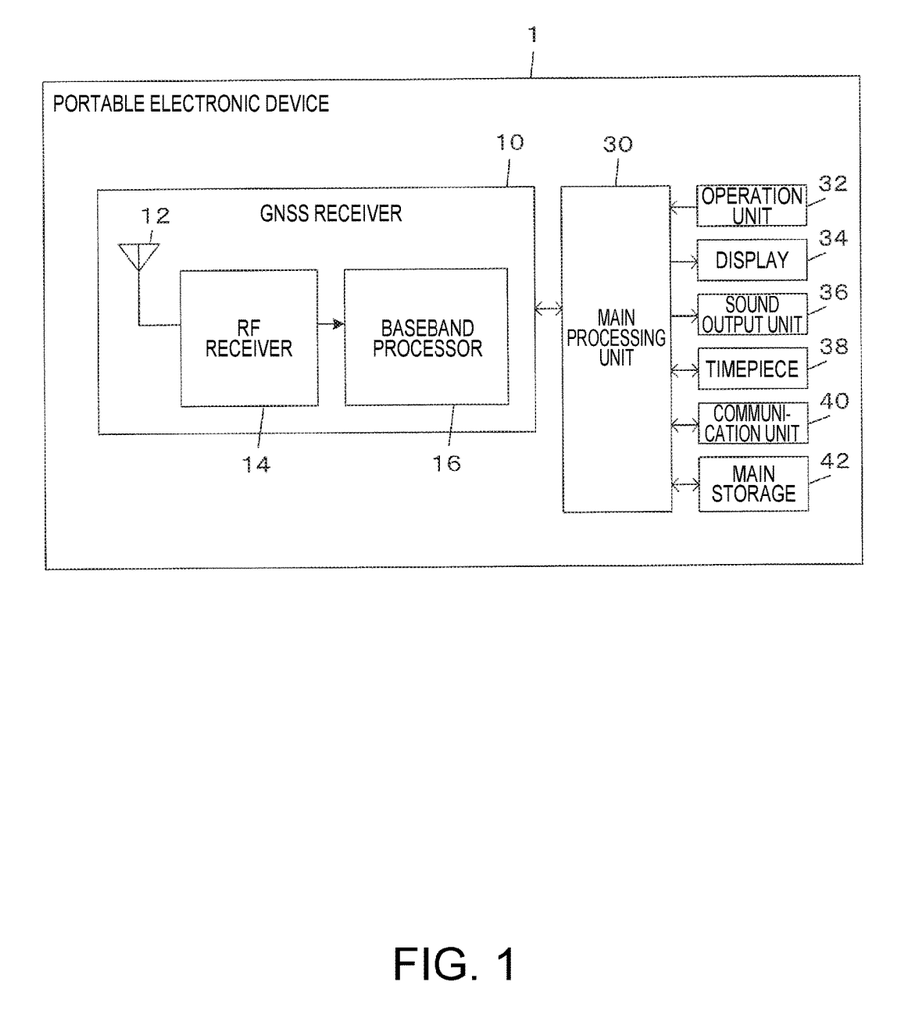
FIG. 1 is a configuration diagram of a portable electronic device.

FIG. 1 is an entire configuration diagram of a portable electronic device 1 of the present embodiment. The portable electronic device 1 is a small-sized electronic device which is carried by a user or is used while being worn on an arm or a wrist, and is, for example, a wristwatch type. The portable electronic device 1 includes a Global Navigation Satellite Systems (GNSS) receiver 10, a main processing unit 30, an operation unit 32, a display 34, a sound output unit 36, a timepiece 38, a communication unit 40, and a main storage 42.

The GNSS receiver 10 is a so-called multi-GNSS correspondence receiver capable of performing positioning using a plurality of satellite positioning systems such as GPS, Quasi-Zenith Satellite Systems (QZSS), and GLONASS, and calculates a position or a timepiece error of the GNSS receiver 10 based on information transported while being superimposed on a received positioning satellite signal. The GNSS receiver 10 includes a reception antenna 12, a radio frequency (RF) receiver 14, and a baseband processor 16. The RF receiver 14 and the baseband processor 16 may be manufactured as separate large-scale integration (LSI), or may be manufactured as one chip. The GNSS receiver 10 may not include the reception antenna 12, and may include the RF receiver 14 and the baseband processor 16.

The reception antenna 12 is configured to receive signals having carrier frequencies of satellite signals of the plurality of satellite positioning systems capable of being used by the GNSS receiver 10.

The RF receiver 14 down-converts the signal received by the reception antenna 12 into a signal having an intermediate frequency, and amplifies the converted signal. The RF receiver converts the amplified signal into a digital signal, and outputs the converted digital signal. If the RF receiver is a circuit of a direct conversion type, the RF receiver may directly convert the received signal into a signal having a baseband frequency, may convert the converted signal into a digital signal, and output the converted digital signal.

The baseband processor 16 captures a satellite signal of a satellite positioning system as a capturing target by using data of the reception signal output from the RF receiver 14, and calculates a position (also referred to as a position of portable electronic device 1) of the GNSS receiver 10 or a timepiece error measured by an internal timepiece of the GNSS receiver 10 or the timepiece 38 by using time information and satellite orbit information extracted from the captured satellite signal.

The main processing unit 30 is an arithmetic processing device constituted by a processor such as a central processing unit (CPU), a field-programmable gate array (FPGA) or an application-specific integrated circuit (ASIC), and generally controls the respective units of the portable electronic device 1 according to various programs such as system programs stored in the main storage 42. Various processes are performed based on the positioning result of the GNSS receiver 10.

The operation unit 32 is an input device constituted by a touch panel or a button switch, and outputs an operation signal corresponding to an operation of the user to the main processing unit 30. The display 34 is a display device constituted by a liquid crystal display (LCD), and performs various display tasks based on a display signal from the main processing unit 30. The sound output unit 36 is a sound output device constituted by a speaker, and outputs various sounds based on a sound signal from the main processing unit 30. The timepiece 38 is an internal timepiece, is constituted by an oscillator including a crystal oscillator, and measures an elapsed time from the designated timing or a current time. The communication unit 40 is a wireless communication device such as a wireless local area network (LAN) or Bluetooth (registered trademark), and communicates with an external device.

The main storage 42 is a storage device constituted by a read only memory (ROM) or a random access memory (RAM), and stores programs or data for causing the main processing unit 30 to realize various functions of the portable electronic device 1. The main storage is used as a work area of the main processing unit 30, and temporarily stores a calculation result of the main processing unit 30 or operation data from the operation unit 32.

RF Receiver

Figure 2:
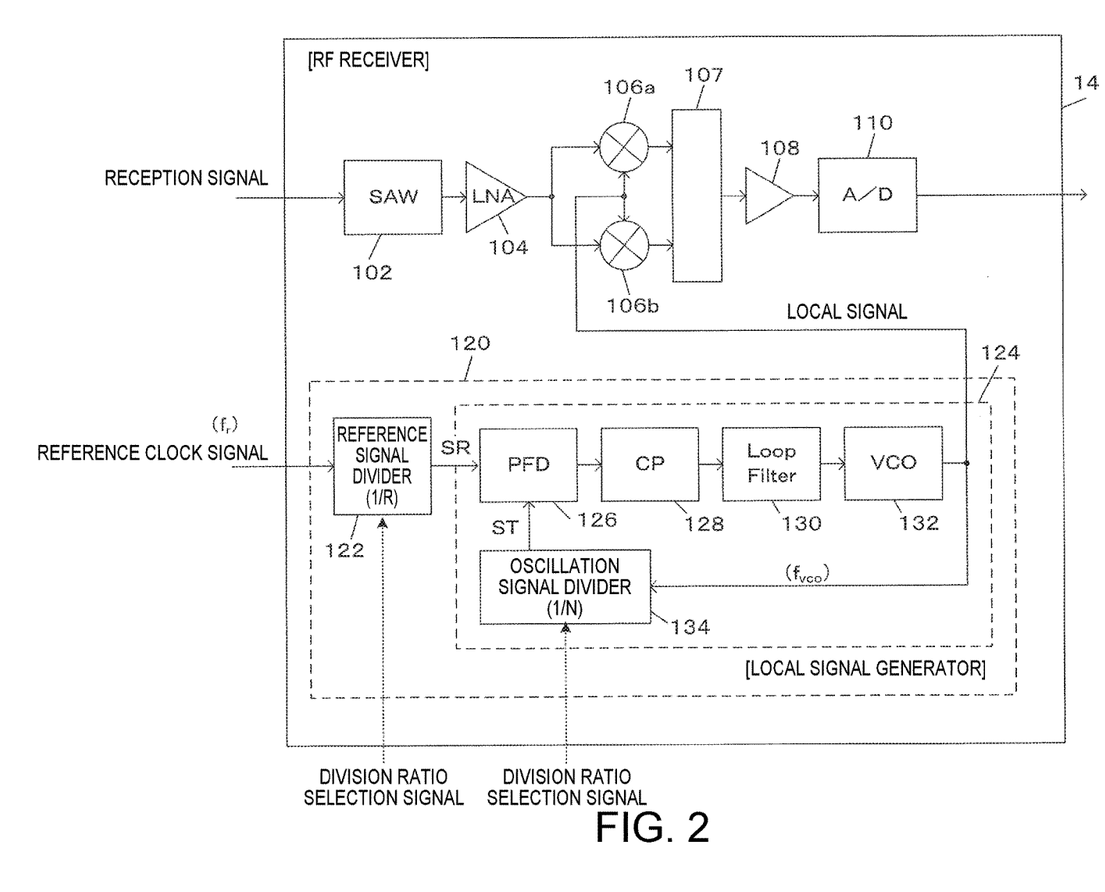
FIG. 2 is a configuration diagram of an RF receiver.

FIG. 2 is a configuration diagram of the RF receiver 14. The RF receiver 14 includes a surface acoustic wave (SAW) filter 102, a low noise amplifier (LNA) 104, a first mixer 106a, a second mixer 106b, a complex filter 107, an amplifier 108, an analog/digital (A/D) converter 110, and a local signal generator 120. The RF receiver 14 corresponds to a satellite signal reception device, but the GNSS receiver 10 including the RF receiver 14 may be referred to as the satellite signal reception device.

The SAW filter 102 is a band-pass filter, and passes a signal having a predetermined band including the frequency of the RF signal for the reception signal received by the reception antenna 12, and blocks a frequency component outside the band. The RF receiver 14 may not include the SAW filter 102. The LNA 104 is a low-noise amplifier, and amplifies an output signal of the SAW filter 102.

The first mixer 106a and the second mixer 106b combine the output signal of the LNA 104 with the local signal which is the output signal of the local signal generator 120, and converts the combined signal into an intermediate frequency signal (hereinafter, referred to as an IF signal). In the present embodiment, an I-phase local signal and a Q-phase local signal of which the phase is 90 degrees different from that of the I-phase local signal are output from the local signal generator 120. The I-phase local signal is input to the first mixer 106a, and the Q-phase local signal is input to the second mixer 106b. The local signal is also called a local oscillation signal. The first mixer 106a and the second mixer 106b are frequency converters that convert reception signals into intermediate-frequency signals by respectively multiplying a reception signal of a first positioning satellite signal by a signal having a first local frequency and a reception signal of a second positioning satellite signal by a signal having a second local frequency.

The complex filter 107 removes an image signal from the output signal (I-phase IF signal) of the first mixer 106a and the output signal (Q-phase IF signal) of the second mixer 106b.

The amplifier 108 amplifies the output signal of the complex filter 107. If a variable-gain amplifier is used, the amplifier 108 may stabilize an output level of the signal from the amplifier 108. The A/D converter 110 converts the output signal of the amplifier 108 which is an analog signal into a digital signal.

The local signal generator 120 generates the signal while switching between the local signals having the frequencies corresponding to the satellite signals of the satellite positioning systems received by the GNSS receiver 10 by using a given reference clock signal. The reference clock signal is, for example, a high-precision signal having a predetermined frequency generated by a temperature-compensated crystal oscillator (TCXO). The local signal generator 120 includes a reference signal divider 122, and a phase-locked loop (PLL) 124.

The reference signal divider 122 is an integer divider which divides the reference clock signal at a division ratio 1/R (R is an integer of 1 or more), and outputs a reference signal SR. The division ratio 1/R is changed depending on a division ratio selection signal.

The PLL 124 is configured such that a phase frequency detector (PFD) 126, a charge pump 128, a loop filter 130, a voltage-controlled oscillator (VCO) 132, and an oscillation signal divider 134 are connected in a loop shape.

The phase frequency detector 126 compares phases of the reference signal output from the reference signal divider 122 with the output signal (that is, 1/N-divided signal ST of the oscillation signal of the voltage-controlled oscillator 132) of the oscillation signal divider 134, and outputs a signal having a voltage pulse corresponding to a phase difference. The charge pump 128 performs voltage-to-current conversion on the output signal of the phase frequency detector 126. The loop filter 130 is a low pass filter (LPF), and performs voltage-to-current conversion and smoothing on an output current of the charge pump 128. That is, a control signal that Operates the voltage-controlled oscillator 132 is generated such that a frequency difference between the reference signal SR and the 1/N-divided signal ST is educed by the phase frequency detector 126, the charge pump 128, and the loop filter 130.

The voltage-controlled oscillator 132 is, for example, a ring oscillator, and oscillates in a frequency corresponding to the output voltage of the loop filter 130. That is, a signal having a frequency corresponding to the control signal generated by the loop filter 130 is generated. The output signal of the voltage-controlled oscillator 132 is a local signal output from the local signal generator 120. The voltage-controlled oscillator 132 is equivalent to an oscillator that oscillates the output signal of the local signal generator in response to a given control signal.

The oscillation signal divider 134 is an integer divider that divides the oscillation signal of the voltage-controlled oscillator 132 at a division ratio 1/N (N is an integer of 1 or more). The division ratio 1/N is changed depending on the division ratio selection signal. That is, in the local signal generator 120, it is assumed that a frequency of the reference clock signal is "$f_r$" and an oscillation frequency of the voltage-controlled oscillator 132 is "$f_{vco}$", a local signal having an oscillation frequency $f_{vco}$ that satisfies $f_r/R = f_{vco}/N$ is output.

Division ratios 1/R and 1/N of the reference signal divider 122 and the oscillation signal divider 134 are selected depending on the satellite signals of the satellite positioning systems received by the GNSS receiver 10. Specifically, the division ratios 1/R and 1/N are determined by the carrier frequencies of the satellite signals of the plurality of satellite positioning systems capable of being used in the GNSS receiver 10 and the frequency of the reference clock signal, and are selected such that a local signal having a frequency which is common (is overlapped) with at least a part of the frequency band of the IF signal after the reception signals of the satellite signals are combined with the local signal.

Figure 3:
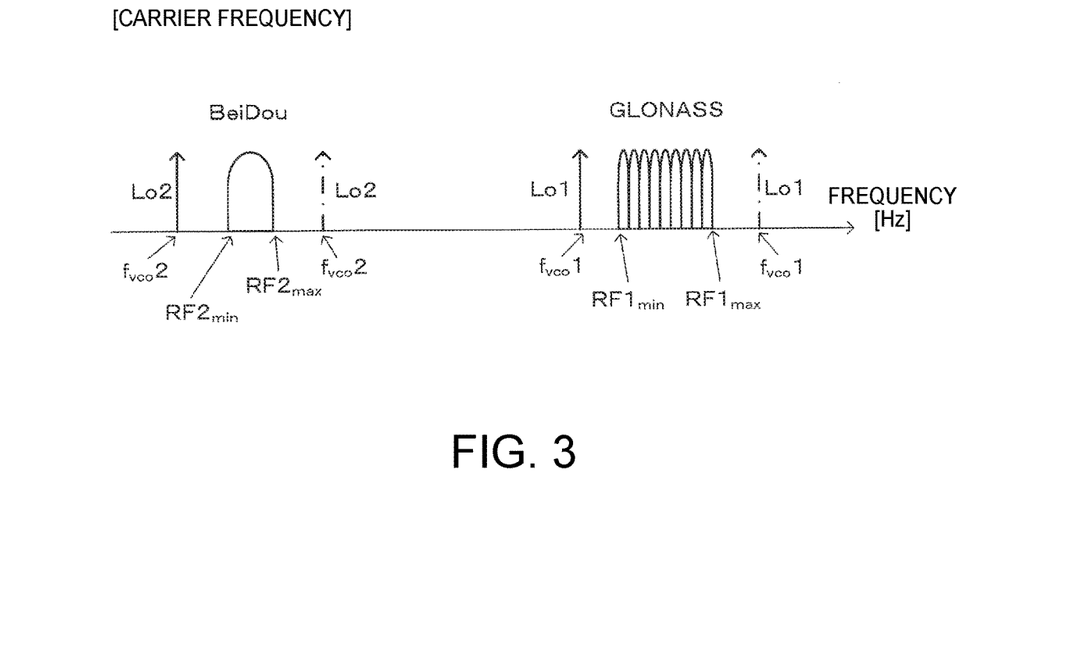
FIG. 3 is an example of the relationship between a carrier frequency and a local signal.
Figure 4:
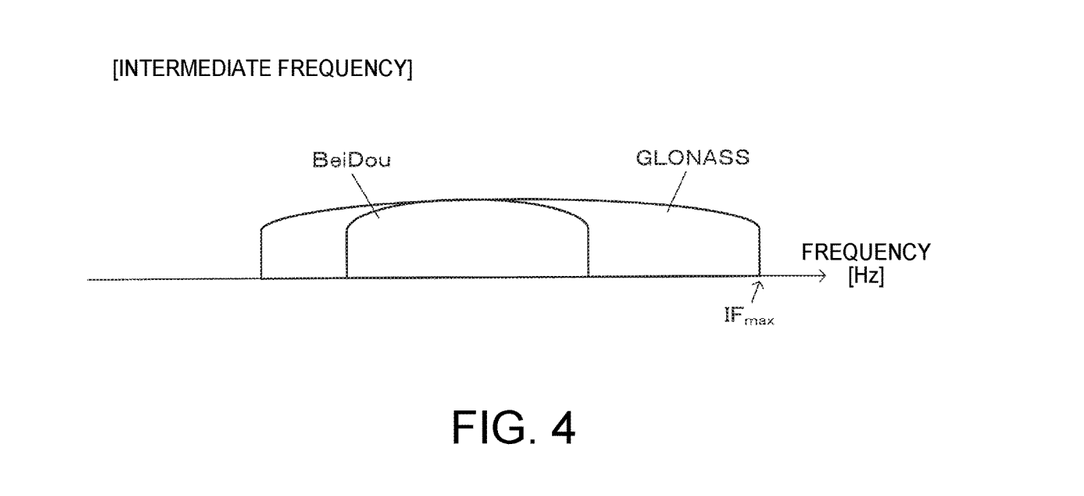
FIG. 4 is an example of an intermediate frequency of the carrier frequency and the local signal shown in FIG. 3.

FIG. 3 shows an example of carrier frequencies of satellite signals of two certain types of satellite positioning systems, and FIG. 4 is a diagram showing an example of an intermediate frequency of the carrier frequencies of FIG. 3. In FIG. 3, the carrier frequencies are shown with a local signal Lo. FIG. 4 shows an example of the intermediate frequency converted using the local signal Lo of FIG. 3. It is assumed that the frequency of the local signal Lo is different for each satellite positioning system and a frequency lower than the carrier frequency is used, a frequency higher than the carrier frequency may be used as depicted by a dashed dotted line in FIG. 3. The frequency lower than the carrier frequency may be used for the one satellite positioning system, and the frequency higher than the carrier frequency may be used for the other satellite positioning system.

For example, if GLONASS and BeiDou are described as an example of the satellite positioning system, the carrier frequency of the satellite signal is about 1598 MHz to 1606 MHz in GLONASS, and is about 1560 MHz to 1563 MHz in BeiDou. Since the carrier frequency band in BeiDou is narrower than that in GLONASS, intermediate frequency band in BeiDou is also narrower than that in GLONASS. Thus, as shown in FIGS. 3 and 4, an example in which the frequencies of the local signals are determined such that the intermediate frequency band used in BeiDou is included in the intermediate frequency band used in GLONASS.

The frequency of the local signal will be described in detail. Initially, a maximum value $IF_{max}$ of the intermediate frequency needs to be equal to or greater than a bandwidth of the reception signal. That is, if a maximum value of the carrier frequency of the first satellite positioning system is $RF1_{max}$, a minimum value thereof is $RF1_{min}$, a maximum value of the carrier frequency of the second satellite positioning system is $RF2_{max}$, and a minimum value thereof is $RF2_{min}$ (here, $RF1_{min} > RF2_{max}$), the maximum value of the intermediate frequency needs to satisfy Expressions (1a) and (1b). In the example of FIGS. 3 and 4, the first satellite positioning system corresponds to GLONASS, and the second satellite positioning system corresponds to BeiDou.

$$IF_{max} \geq RF1_{max} - RF1_{min} \quad (1a)$$

$$IF_{max} \geq RF2_{max} - RF2_{min} \quad (1b)$$

It is preferable that the frequency of the local signal is a frequency in which the maximum frequency $IF_{max}$ of the intermediate frequency that satisfies Expressions (1a) and (1b) is acquired and is equal to or less than the minimum value of the carrier frequency or is equal to or greater than the maximum value thereof (Expressions (2) to (5)). The reason why the frequency of the local signal is equal to or less than the minimum value of the carrier frequency or is equal to or greater than the maximum value thereof is that if the frequency of the local signal is included in the carrier frequency band, the phase of the converted intermediate frequency is reversed.

That is, it is preferable that a frequency $f_{vco}1$ of a local signal Lo1 of the first satellite positioning system satisfies any one of Expressions (2) and (3). Expression (2) is a condition in which the local frequency $F_{vco}1$ is equal to or less than the minimum value $RF1_{min}$ of the carrier frequency, and Expression (3) is a condition in which the local frequency $f_{vco}1$ is equal to or greater than the maximum value $RF1_{max}$ of the carrier frequency.

$$RF1_{max} - IF_{max} \leq f_{vco}1 \leq RF1_{min} \quad (2)$$

$$RF1_{max} \leq f_{vco}1 \leq RF1_{min} + IF_{max} \quad (3)$$

It is preferable that a frequency $f_{vco}2$ of a local signal Lo2 of the second satellite positioning system satisfies any one of Expressions (4) and (5). Expression (4) is a condition in which the local frequency $f_{voc}2$ is equal to or less than the minimum value $RF2_{min}$ of the carrier frequency, and Expression (5) is a condition in which the local frequency $f_{vco}2$ is equal to or greater than the maximum value $RF2_{max}$ of the carrier frequency.

$$RF2_{max} - IF_{max} \leq f_{vco}2 \leq RF2_{min} \qquad (4)$$

$$RF2_{max} \leq f_{vco}2 \leq RF2_{min} + IF_{max} \qquad (5)$$

Here, both the combination of the local frequencies that satisfy Expression (2) and Expression (5) and the combination of the local frequencies that satisfy Expression (3) and Expression (4) are the combination in which one satellite positioning system uses the frequency lower than the carrier frequency and the other satellite positioning system uses the frequency higher than the carrier frequency. In this case, the phase of the IF frequency of the first satellite positioning system and the phase of the IF frequency of the second satellite positioning system are different from each other. Thus, it is necessary to switch between signal processing performed on the I-phase signal and signal processing performed on the Q-phase signal in a circuit subsequent to the first mixer 106a and the second mixer 106b in two different types of satellite positioning system. Specifically, the input of the I-phase local signal and the input of the Q-phase local signal to the first mixer 106a and the second mixer 106b are switched using a switch, or the input of the I-phase IF signal and the input of the Q-phase IF signal to the complex filter 107 are switched using a switch.

The combination of the local frequencies that satisfy Expression (2) and Expression (4), and the combination of the local frequencies that satisfy Expression (3) and Expression (5) are respectively a combination of frequencies lower than the carrier frequency and a combination of frequencies higher than the carrier frequency. In this case, in a case where these combinations are used as the local frequency, the phase of the IF frequency of the first satellite positioning system and the phase of the IF frequency of the second satellite positioning system match each other. Accordingly, it is not necessary to provide the switch in a circuit subsequent to the first mixer 106a and the second mixer 106b.

Since the carrier frequency is different for each satellite positioning system, the local frequency which is common with a part of the converted intermediate frequency band is also different for each satellite positioning system. That is, the division ratios 1/N and 1/R different for a plurality of satellite positioning systems are determined.

Figure 5:
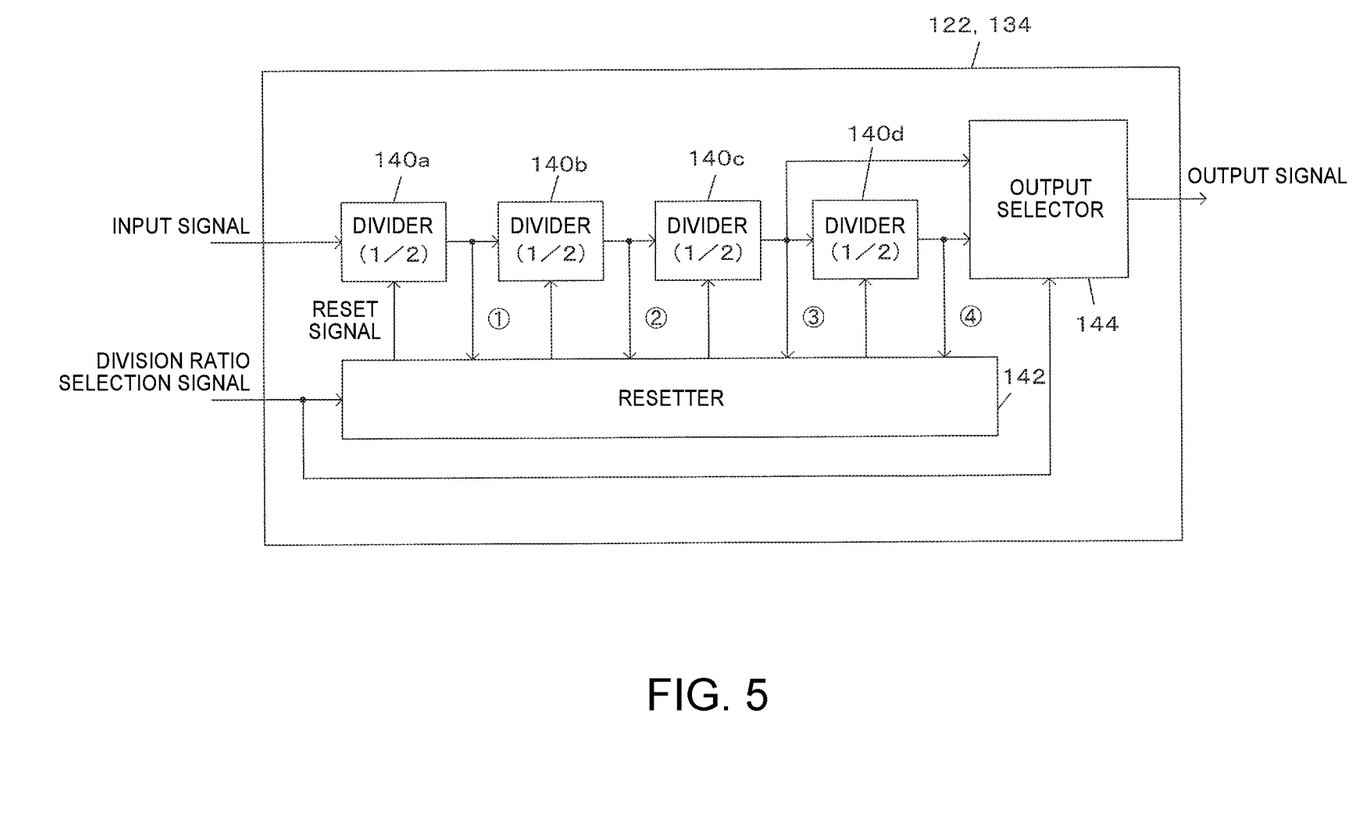
FIG. 5 is a configuration diagram showing a reference signal divider and an oscillation signal divider.

The local signal generator 120 generates the signal while switching between the local signal having the frequency corresponding to the satellite positioning system by selecting the division ratio 1/R of the reference signal divider 122 and the division ratio 1/N of the oscillation signal divider 134 depending on the satellite signals of the satellite positioning systems received by the GNSS receiver 10. That is, the local signal having the frequency corresponding to the first positioning satellite signal is switched and output when the first positioning satellite signal which is the satellite signal of the first satellite positioning system is received, and the local signal having the frequency corresponding to the second positioning satellite signal is switched and output when the second positioning satellite signal which is the satellite signal of the second satellite positioning system.
Divider FIG. 5 is a circuit configuration diagram of the reference signal divider 122 and the oscillation signal divider 134 (hereinafter, inclusively referred to as "dividers 122 and 134"). The dividers 122 and 134 have the same circuit configuration, and include four dividers 140a to 140d connected in series, an output selector 144, and a resetter 142. The dividers divide the input signal at a division ratio selected by the division ratio selection signal.

A minimum division ratio 1/M at which the dividers 122 and 134 can divide the signal is determined depending on the number of dividers 140 (the number of stages) Specifically, in a case where A number (A stages) of dividers 140 are provided, the signal can be divided at a division ratio 1/M ($M=2$ to $2^A$). In FIG. 5, since four (four stages) of dividers 140 are provided, the signal can be divided at a ratio of 1/M ($M=2$ to 16). The division ratio selection signal designates an inverse value of the division ratio. For example, in a case where the division ratio is 1/M, a signal which designates M which is the inverse value thereof is used.

The dividers 140a to 140d are 1/2 dividers of which the division ratio is 1/2, and divide the input signal at a division ratio of 1/2. If a reset signal is input from the resetter 142, the dividers 140a to 140d reset the output signal The resetter 142 decodes a 4-bit data value acquired by sequentially expressing the output values of the dividers 140a to 140d as a bit value, and outputs the reset signal when the decoded value reaches a value designated by the division ratio selection signal.

The output selector 144 selects the output signal of the divider 140c or the divider 140d, as the output signal of the dividers 122 and 134 depending on the division ratio selection signal. Specifically, the output selector selects the output signal of the divider 140c if the division ratio selected by the division ratio selection signal is 1/M ($M=5$ to 8), and selects the output signal of the divider 140d if the division ratio selected by the division ratio selection signal is 1/M ($M=9$ to 16).

Figure 6:
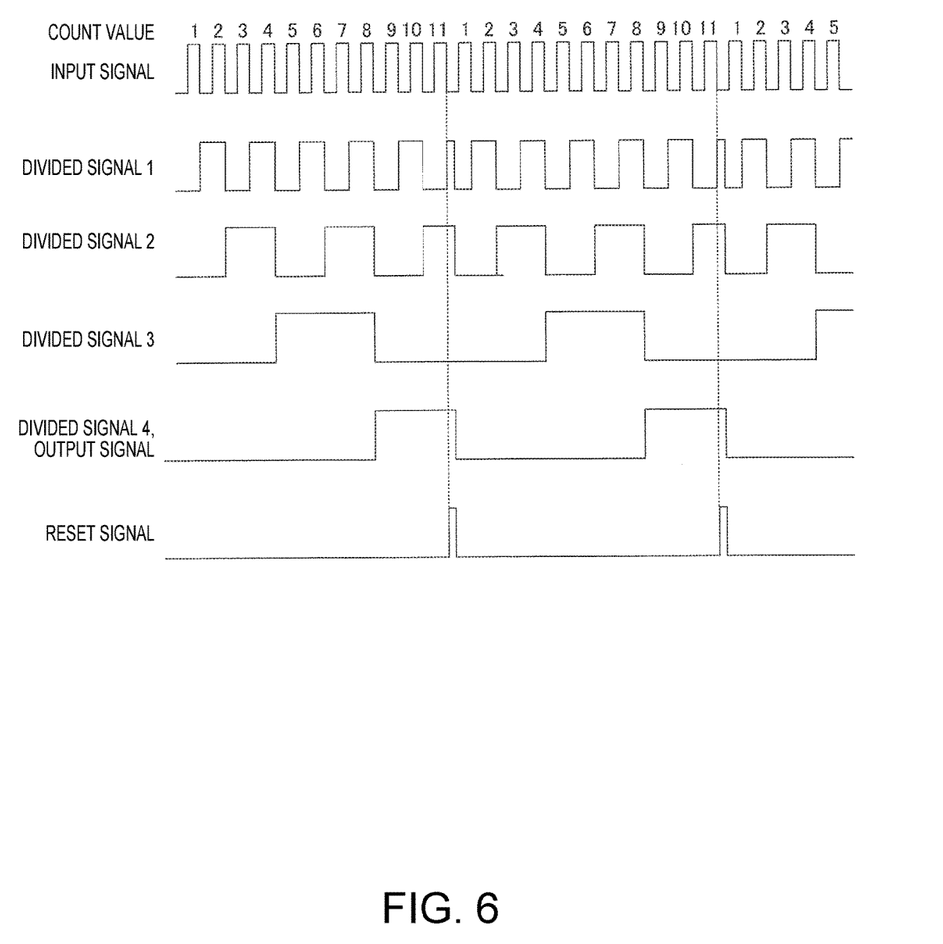
FIG. 6 is an operation waveform diagram of the reference signal divider and the oscillation signal divider.

FIG. 6 is an example of an operation waveform of the dividers 122 and 134. In FIG. 6, a pulse signal which is the input signal to the dividers 122 and 134, divided signals 1 to 4 outputs from the dividers 140a to 140d, and a reset signal output from the resetter 142 are illustrated in order from the top. An example in which the division ratio is 1/11 is illustrated.

Four dividers 140a to 140d function as counters of which output values are count values of the pulse of the input signal. The resetter 142 decodes the count value of the pulse of the input signal, and outputs the reset signal if the decoded value reaches "11" designated by the division ratio selection signal. Thus, all the output signals of the dividers 140a to 140d are reset (becomes an L level). As stated above, the reset signal is output whenever the count value reaches "11", and the count value is repeatedly counted from "1" again. Accordingly, the output signal of the divider 140d which is the output signal of the dividers 122 and 134 is the signal acquired by dividing the input signal at a division ratio of 1/11.

Advantages and Effects

As mentioned above, according to the present embodiment, the GNSS receiver 10 generates the signal while switching to the frequency of the local signal depending to the received positioning satellite signal. Since the local signal is generated by being switched to the local frequencies corresponding to the plurality of positioning satellite signals such that at least a part of the frequency band of the converted intermediate frequency is common, it is possible to commonly use the processor for the converted intermediate frequency signals. Thus, the plurality of positioning satellite signals can be received by one RF receiver 14, and thus, it is possible to reduce the size of the device and power consumption by commonly using the processor for the plurality of signals. The converted intermediate frequency is lowered, and thus, it is possible to reduce power consumption required in the operation of the commonly used processor.

The applicable embodiments of the invention are not limited to the above-described embodiments, and may be appropriately modified without departing from the gist of the invention.

(A) Divider in the dividers 122 and 134 shown in FIG. 5, the output selector 144 selects the output signal of the divider 140*a*, and thus, the signal may be divided at a division ratio of 1/2. The output selector selects the output signal of the divider 140*b*, and thus, the signal may be divided at a division ratio of 1/3 or 1/4.

The number of dividers 140 (the number of stages) which are connected in series and are included in the dividers 122 and 134 may be five or more, or may be two or three. The number of dividers 140 is increased, and thus, it is possible to realize a divider having a lower division ratio.

(B) Type of Satellite Positioning System Capable of Receiving Signals by RF Receiver 14

Although it has been described in the above-described embodiment that there are two types of the satellite positioning systems capable of receiving satellite signals by the RF receiver 14, there may be three types of satellite positioning systems. The division ratios 1/R and 1/N may be selected such that the local signal having the frequency which is common (overlapped) with a part of the frequency band of the IF signal after the carrier frequencies of the satellite signals of the satellite positioning systems are combined with the local signal is generated.

(C) Third Satellite Positioning System

The satellite signal reception device may further include a second local signal generator and a second frequency converter for receiving a satellite signal of a third satellite positioning system.

Figure 7:
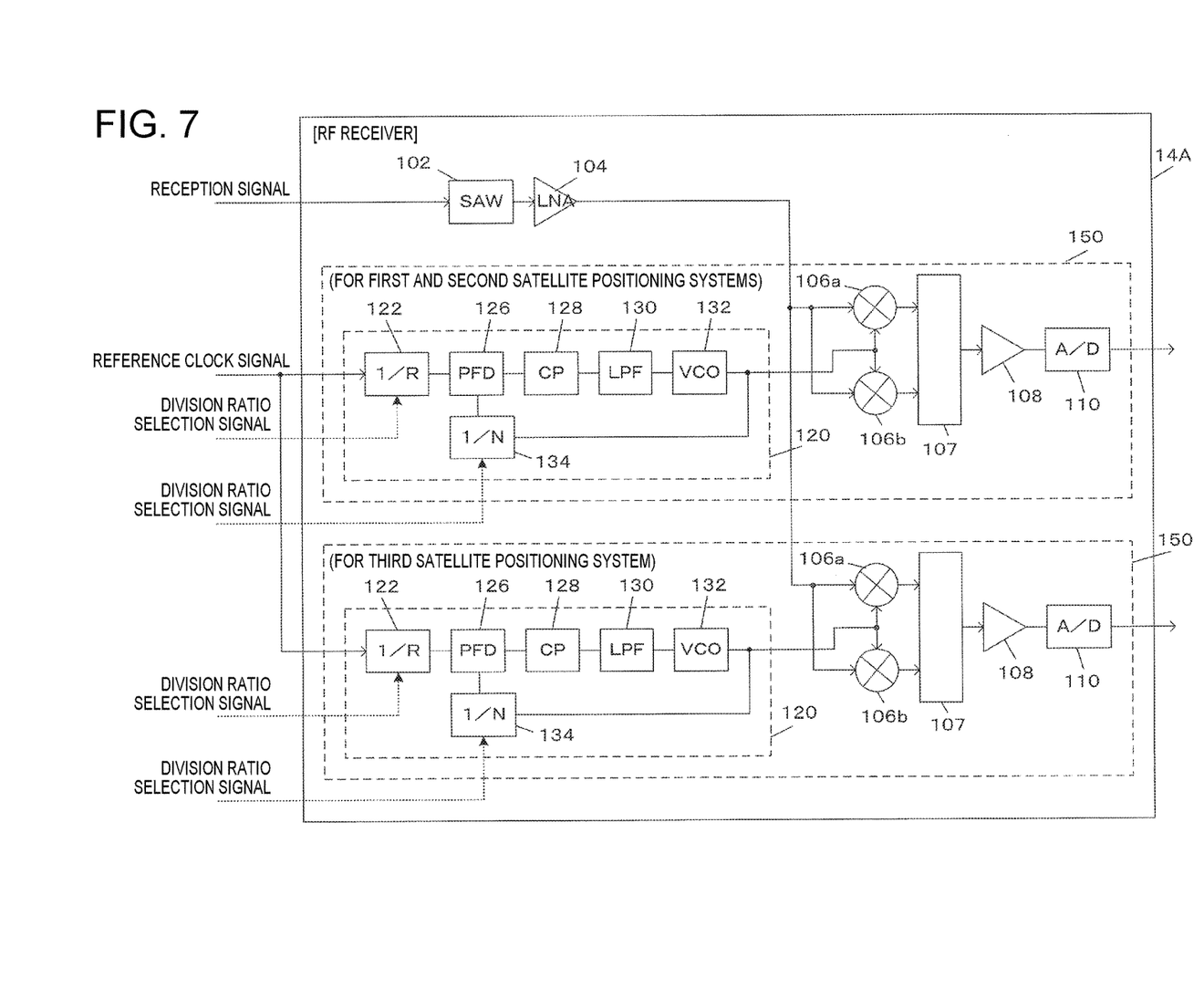
FIG. 7 is another configuration example of the RF receiver.

FIG. 7 is another configuration example of an RF receiver 14A. In FIG. 7, the same components as those in the above-described embodiment will be assigned to the same reference numerals, and the detailed description thereof will be omitted. In FIG. 7, the RF receiver 14A includes the SAW filter 102, the LNA 104, and two system receivers 150. The two system receivers 150 have the same configuration, and include the local signal generator 120, the first mixer 106*a* and the second mixer 106*b* which are the frequency converters, the complex filter 107, the amplifier 108, and the A/D converter 110, in the system receivers 150, a desired local signal may be generated while being switched between the division ratio 1/R of the reference signal divider 122 and the division ratio 1/N of the oscillation signal divider 134 which are included in the local signal generator 120 depending on the reception frequency of the received satellite signal of the satellite positioning system and the converted intermediate frequency.

According to the RF receiver 14A, it is possible to cope with a maximum of four satellite positioning systems. For example, one of the two system receivers 150 may be used for the first satellite positioning system and the second satellite positioning system, and the other one thereof may be used for the third satellite positioning system and a fourth satellite positioning system. The division ratio 1/R of the reference signal divider 122 and the division ratio 1/N of the oscillation signal divider 134 are switched depending on the received satellite signals of the satellite positioning systems. One of the two system receivers may be used as dedicated receivers to the first satellite positioning system and the second satellite positioning system (for example, may be used for GLONASS and BeiDou), and the other one thereof may be used as a dedicated receiver to the third satellite positioning system (for example, may be used for GPS (of course, may be used for both GALILEO and QZSS (Michibiki) having the same carrier frequency)). One system receiver 150 receives one of two satellite positioning systems while switching between the division ratio 1/R of the reference signal divider 122 and the division ratio 1/N of the oscillation signal divider 134. That is, the reception is stopped during the switching. Thus, one system receiver 150 is used as a dedicated receiver to one satellite positioning system, and thus, it is possible to receive the satellite signal in the satellite positioning system without stopping the reception during the switching.

The RF receiver 14 may include three or more system receivers 150.

The entire disclosure of Japanese Patent Application No. 2016-057296, filed Mar. 22, 2016 is expressly incorporated by reference herein.

What is claimed is:

1. A satellite signal reception device comprising:
   a local signal generator that generates an output signal while switching between a signal having a first local frequency corresponding to a first positioning satellite signal and a signal having a second local frequency corresponding to a second positioning satellite signal based on a reference clock signal; and
   a frequency converter that converts a reception signal of the first positioning satellite signal into a first intermediate frequency signal by multiplying the reception signal of the first positioning satellite signal by the signal having the first local frequency, and converts a reception signal of the second positioning satellite signal into a second intermediate frequency signal of which at least a part of a converted frequency band is in common with the first intermediate frequency signal by multiplying the reception signal of the second positioning satellite signal by the signal having the second local frequency,
   wherein the local signal generator includes
   a reference signal divider that divides the reference clock signal using different division ratios for the first and second satellite positioning signals to produce a reference signal, and
   a PLL that includes (i) an oscillator which oscillates the output signal of the local signal generator, (ii) an oscillation signal divider which divides the output signal oscillated by the oscillator using different division ratios for the first and second satellite positioning signals to produce a divided signal, and (iii) a filter which compares the reference signal and the divided signal and generates a control signal for the oscillator that reduces a frequency difference between the reference signal and the divided signal.

2. The satellite signal reception device according to claim 1, further comprising:
   a second local signal generator that generates a signal having a third local frequency corresponding to a third positioning satellite signal based on the reference clock signal; and
   a second frequency converter that converts a reception signal of the third positioning satellite signal into a third intermediate frequency signal by multiplying the reception signal of the third positioning satellite signal by the signal having the third local frequency.

3. The satellite signal reception device according to claim 2, wherein the reference signal divider and the oscillation signal divider are integer dividers in which 1/2 dividers having a division ratio of 1/2 are connected in series.

4. The satellite signal reception device according to claim 1, wherein the reference signal divider and the oscillation signal divider are integer dividers in which 1/2 dividers having a division ratio of 1/2 are connected in series.

* * * * *